No. 621,189. Patented Mar. 14, 1899.
G. WEISS.
MOLDING MACHINE.
(Application filed Feb. 2, 1898.)
(No Model.) 4 Sheets—Sheet 1.

WITNESSES: M. Maegerlein. M. R. Rochford.

INVENTOR Georg Weiss. BY Ludington & Jones ATTORNEYS.

No. 621,189. Patented Mar. 14, 1899.
G. WEISS.
MOLDING MACHINE.
(Application filed Feb. 2, 1898.)
(No Model.) 4 Sheets—Sheet 2.
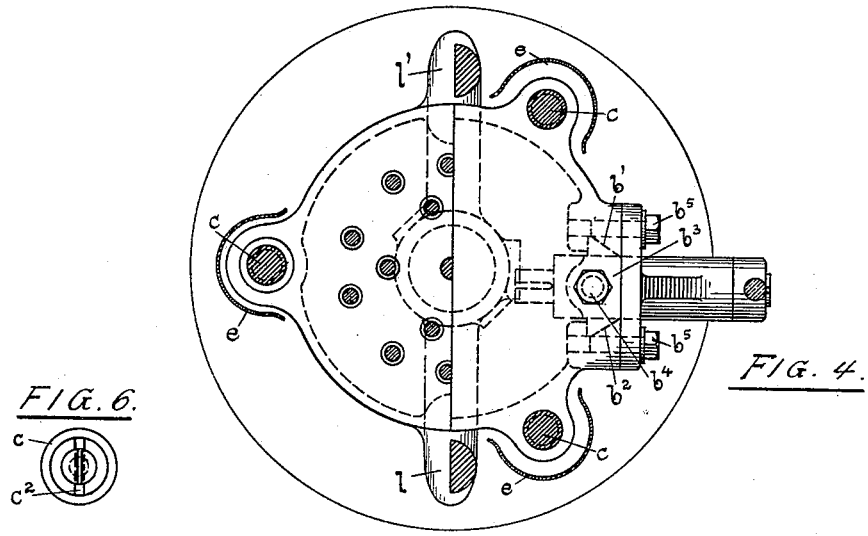
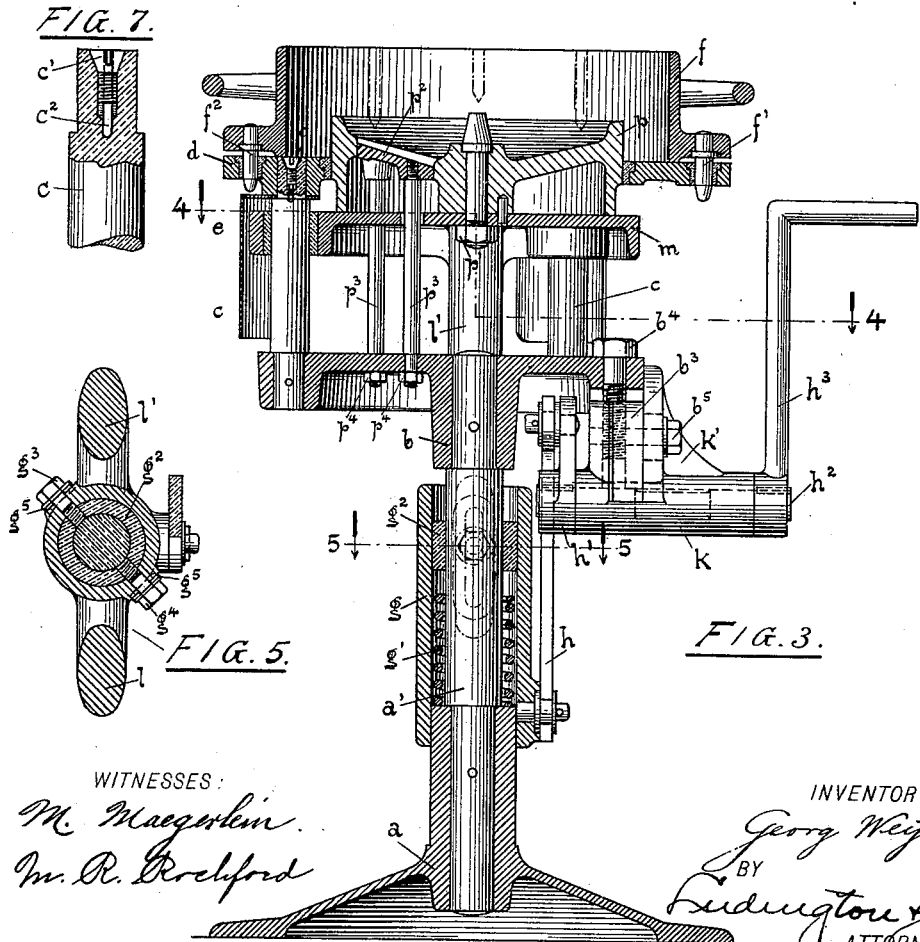
WITNESSES:
M. Maegerlein
M. R. Rochford
INVENTOR
Georg Weiss
BY
Ludington & Jones
ATTORNEYS.

No. 621,189. Patented Mar. 14, 1899.
G. WEISS.
MOLDING MACHINE.
(Application filed Feb. 2, 1898.)
(No Model.) 4 Sheets—Sheet 2.

WITNESSES:
M. Maegerlein.
M. R. Rochford.

INVENTOR
Georg Weiss.
BY
Ludington & Jones
ATTORNEYS.

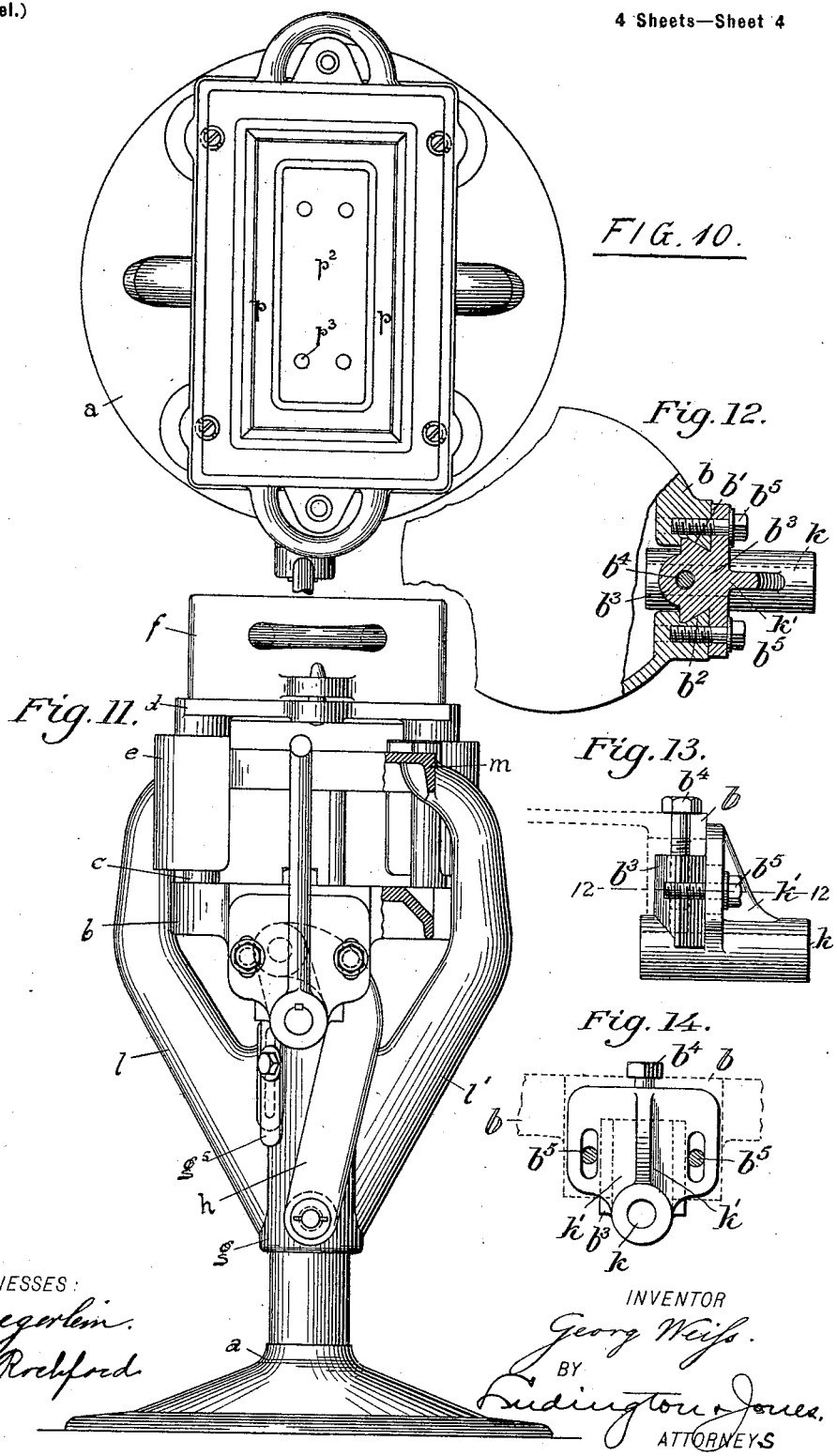

UNITED STATES PATENT OFFICE.

GEORG WEISS, OF CHICAGO, ILLINOIS.

MOLDING-MACHINE.

SPECIFICATION forming part of Letters Patent No. 621,189, dated March 14, 1899.

Application filed February 2, 1898. Serial No. 668,806. (No model.)

*To all whom it may concern:*

Be it known that I, GEORG WEISS, a citizen of the United States, residing at Chicago, in the county of Cook and State of Illinois, have invented a certain new and useful Improvement in Molding-Machines, of which the following is a full, clear, concise, and exact description, reference being had to the accompanying drawings, forming a part of this specification.

My invention relates to a molding-machine, my object being to provide an improved, cheaply-manufactured, and effectively-operating molding-machine for making sand molds for castings.

I have illustrated my invention in the accompanying drawings, in which—

Figure 2:
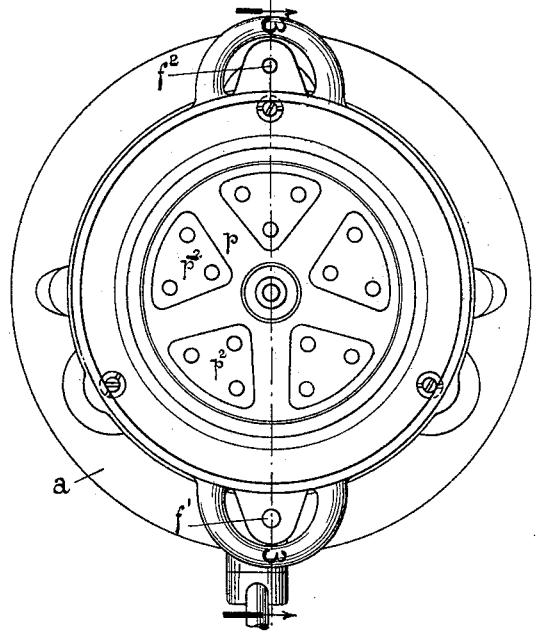
Figure 1:
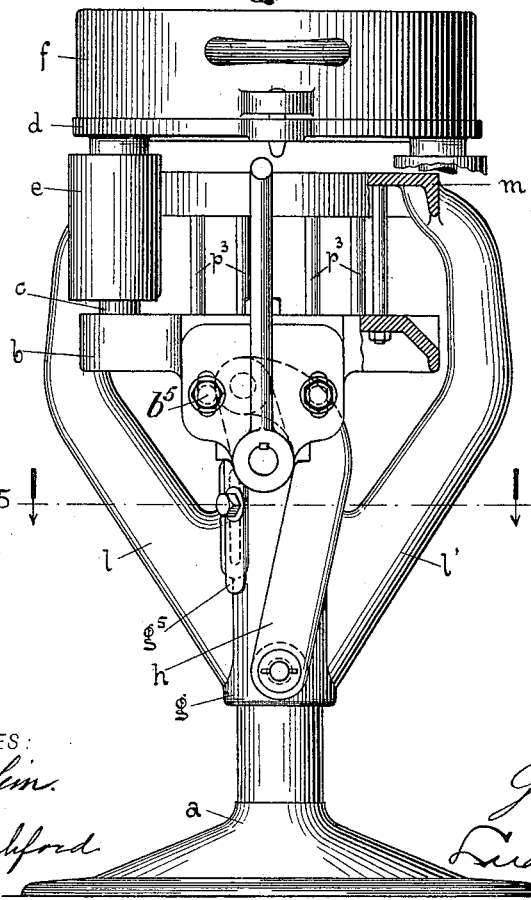
Figure 9:
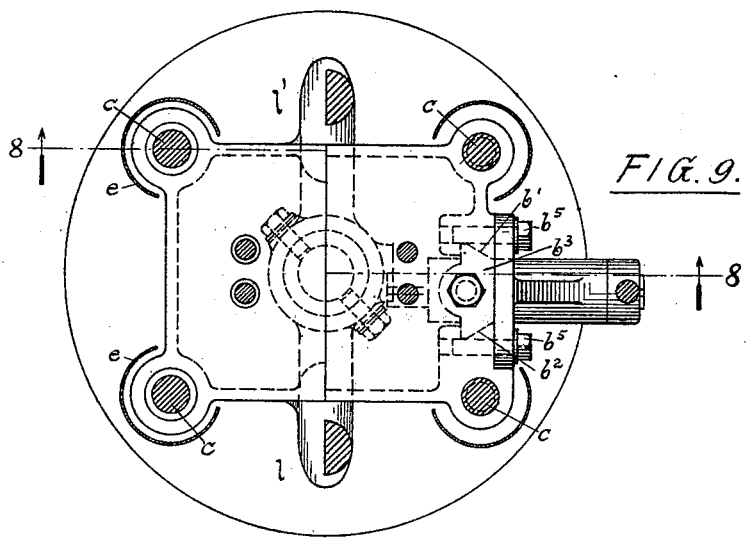
Figure 8:
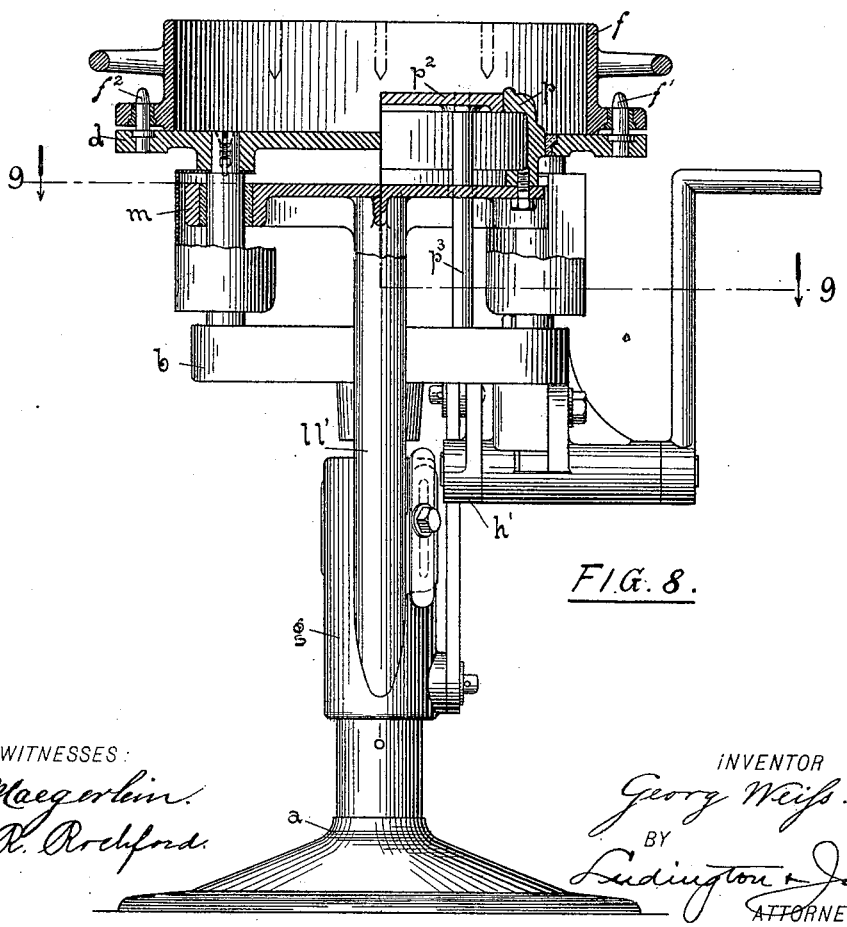

Figure 1 is a view of the machine of my invention in elevation. Fig. 2 is a plan view thereof. Fig. 3 is a sectional view on line 3 3, Fig. 2. Fig. 4 is a sectional view on line 4 4, Fig. 3. Fig. 5 is a sectional view on line 5 5, Fig. 3. Fig. 6 is a plan view of the device for securing the stripper-plate in position. Fig. 7 is a sectional view thereof. Fig. 8 is a view in elevation of a modified form of my invention, the upper portion being shown partially in section along line 8 8, Fig. 9. Fig. 9 is a sectional view along line 9 9, Fig. 8. Fig. 10 is a plan view of the machine shown in Figs. 8 and 9. Fig. 11 is a view thereof in elevation at right angles to the view of Fig. 8. Fig. 12 is a detail view of the adjustable crank-shaft bracket, partially in section, on line 12 12, Fig. 13. Fig. 13 is a side view of same. Fig. 14 is an end view of same.

Like letters refer to like parts in the several figures.

Upon the standard of base-plate $a$ is mounted a rod $a'$, the lower end fitting in a bore provided in the base $a$ and the upper end fitting in a bore provided in the bottom plate $b$. Upon the bottom plate $b$ is mounted a number of supporting and guiding rods $c\ c$, the ends of the rods being secured to bores provided in the bottom plate. Upon the upper ends of the rods $c$ rests the stripper-plate $d$, the stripper-plate being removably secured in position preferably by means of a series of screws $c'$, having tapering heads, a transverse slot $c^2$ being provided in the end of each of the rods $c$, whereby the screwing of the screw $c'$ into position wedges the end of the rod against the walls of the bore provided through the plate $d$. I have illustrated three of these rods $c$ in Figs. 1 to 4 and four in Figs. 8 to 11, and the upper end of each of the rods is provided with a screw $c'$ for securing the stripper-plate in position. Between the bottom of the stripper-plate and a shoulder provided upon each of the rods $c$ is secured a guard-plate $e$, which partially surrounds the rod $c$ and prevents sand from coming in contact therewith. Upon the stripper-plate $d$ the cope or the drag of the flask $f$ is adapted to rest, being maintained in proper position by means of dowel-pins $f'\ f^2$. As it is very advantageous, if not necessary, to have the cope or drag of the flask always occupy when on the machine the same relative position to the pattern, the dowel-pins $f'\ f^2$ are made of different diameters, and likewise the dowel-pin holes in the plate are also of different diameters to correspond with the pins, whereby the placing of the cope or drag of the flask $f$ always in the same position on the plate $d$ is thus insured. Surrounding the rod $a'$, constituting a part of the standard, is a sleeve $g$, to the lower end of which is pivoted the end of a connecting-rod $h$, the upper end of which is pivoted to a crank $h'$, mounted upon a shaft $h^2$, journaled in a bearing $k$, carried upon a bracket $k'$. Upon the end of the shaft $h^2$ is mounted a handle $h^3$, whereby the crank $h'$ may be moved to impart a reciprocating movement to the sleeve $g$. The bracket $k'$ is adjustable upon the bottom plate $b$, the bottom plate being provided with a pair of guides $b'\ b^2$, between which moves a cross head or bar $b^3$, a screw $b^4$ passing through the plate $b$ and screwing into the cross-head $b^3$, whereby the latter may be raised and lowered carrying with it the bracket $k'$. The bracket may be secured in any adjusted position by means of the clamping-screws $b^5\ b^5$. Springing from the sleeve $g$ is a pair of arms $l\ l$, which are bent outward to clear the bottom plate $b$ and which carry at the upper end the pattern-plate $m$, preferably formed integral therewith. The pattern-plate $m$ is provided with bores through which the rods $c$ are respectively adapted to pass, the rods $c$ thus serving the double purpose of acting as guides to guide the pattern-plate $m$ in its movement up and down, as well as of supporting and securing the stripper-plate $d$ to the bottom plate $b$. By moving the handle $h^3$ the sleeve $g$ and the pattern-plate $m$, supported thereon, may be moved up or down as desired, and in order to limit the downward movement of the plunger and afford a cushion or resilient seat therefor a coiled spring $g'$ is provided within the sleeve $g$, encircling the rod $a'$ and resting upon the end of the base $a$. Within the sleeve and surrounding the rod $a'$ is a ring $g^2$, secured to the sleeve $g$, and as the plunger descends the ring engages the end of the coiled spring and the weight of the plunger is imposed upon the coiled spring through the agency of the ring $g^2$. The ring $g^2$ is adjustable in position along the sleeve $g$ by means of bolts or screws $g^3$ $g^4$, which pass through slots in the sleeve and which screw into holes provided in the ring $g^2$. Plates $g^5$, Fig. 1, rest upon the exterior of the sleeve $g$ and are secured, respectively, to the screws $g^3$ $g^4$ to prevent the entrance of sand or dirt through the slots.

Upon the pattern-plate rests the pattern $p$, of the form desired for the particular casting which is to be made, the pattern being secured to the pattern-plate by means of the bolt $p'$ or otherwise, the pattern passing through a corresponding opening in the stripper-plate $d$. The flask $f$ being placed in position, parting-sand is sprinkled over the pattern and stripper-plate and the flask is filled with green sand, which is tamped and leveled off even with the top of the flask. The handle $h^3$ is then turned to depress the plunger and lower the pattern to withdraw the same from the sand in the flask, after which the flask is removed from the stripper-plate. It is frequently necessary to provide supports for the sand—as, for instance, between the spokes of a wheel-pattern—and these supports $p^2$ are secured to the upper ends of the bolts $p^3$ $p^3$, which pass through holes in the plunger and are supported upon and secured to the bottom plate $b$, preferably by means of the nuts $p^4$ $p^4$, removable from the under side of the bottom plate. As the plunger is depressed to lower the pattern the supporting-face $p^2$ remains in position to support the sand and to permit the withdrawal of the pattern without breaking or disturbing the sand forming the mold.

By the above construction the machine has a stable standard and support which occupies a central position and does not occupy much room, and, furthermore, the standard constitutes a guide for the sleeve carrying the plunger. The lower face of the bottom plate is exposed, while the periphery of the bottom plate is free of obstacles, whereby the under side of the bottom plate is readily accessible for the manipulation of the nuts $p^4$ $p^4$. The supporting-rods $c$, which support the stripper-plate in proper position above the bottom plate, also serve as guides for the pattern-plate, which is adapted to be moved up and down between the stripper-plate and the bottom plate, thereby forming a compact, simple, and effective construction which permits of easy access to all the bearing-surfaces and all the adjusting devices of the machine.

By supporting the pattern-plate upon two arms carried upon the sleeve $g$ and bent laterally to clear the periphery of the bottom plate the bottom plate may be readily placed in position and slipped over the end of the rod $a'$ in assembling the parts of the machine, after which the supporting-rods $c$ may be placed in position, and finally the stripper-plate $d$ may be placed upon the ends of the supporting-rods $c$ and secured thereto.

Having described my invention, what I claim as new, and desire to secure by Letters Patent, is—

1. In a molding-machine, the combination with a central support and a bottom plate on the upper end thereof, of a stripper-plate supported above said bottom plate by guides or rods extending between the same, a sleeve movable longitudinally on said central support and having upwardly and outwardly extending arms clearing said bottom plate, and a pattern-plate carried upon the upper ends of said arms and guided by the rods extending between the bottom plate and the stripper-plate, substantially as described.

2. In a molding-machine, the combination with a single central support and a bottom plate thereon, of a movable sleeve on said central support, upwardly and outwardly extending arms on said sleeve adapted to clear the said bottom plate, a solid pattern-plate formed integrally with said arms, a series of supporting-rods attached to said bottom plate and adapted to pass through the pattern-plate to act as guides therefor and a firmly-attached detachable flush top stripper-plate mounted on said supporting-rods, substantially as described.

3. In a molding-machine, the combination with a single central support, and a bottom plate thereon, of a movable sleeve on said central support having upwardly and outwardly extending arms thereon, a pattern-plate formed integrally with said arms and adapted to be moved above said bottom plate, upwardly-extending rods from said bottom plate adapted to act as guides for said pattern-plate and each having a shoulder and an internally-threaded split upper end, a removable stripper-plate adapted to fit on said rods and tapering flat-top screws adapted to screw through said stripper-plate into the end of each rod whereby the stripper-plate, with a perfectly flush top surface, is firmly and securely fastened to said rods, substantially as described.

4. In a molding-machine the combination with a single central support and a bottom plate, of a vertically-adjustable bracket, mounted on the under face of the bottom plate, a bearing for the crank-shaft mounted upon said bracket, the crank-shaft $h^2$, the crank $h'$, the connecting-rod $h$ and the arm and pattern-plate carrying sleeve *g*, substantially as described.

5. In a molding-machine, the combination, substantially as described with a movable pattern-plate of a central support, a movable sleeve thereon, arms extending therefrom and supporting the pattern-plate, a collar longitudinally adjustable in said sleeve and a spring or buffer surrounding said central support and against which said collar is adapted to rest when the sleeve is in the lower position.

In witness whereof I have hereunto subscribed my name in the presence of two witnesses.

GEORG WEISS.

Witnesses:
W. CLYDE JONES,
M. R. ROCHFORD.